United States Patent
Birging et al.

(10) Patent No.: US 8,040,226 B2
(45) Date of Patent: Oct. 18, 2011

(54) VEHICLE SURVEILLANCE AND COMMUNICATION SYSTEM

(75) Inventors: Torbjörn Birging, Storå (SE); Werner Hilliges, Bankeryd (SE)

(73) Assignee: Datachassi DC AB, Jonkoping (SE)

( * ) Notice: Subject to any disclaimer, the term of this patent is extended or adjusted under 35 U.S.C. 154(b) by 718 days.

(21) Appl. No.: 12/029,093

(22) Filed: Feb. 11, 2008

(65) Prior Publication Data

US 2008/0238636 A1     Oct. 2, 2008

(30) Foreign Application Priority Data

Apr. 2, 2007 (SE) ........................................ 0700807

(51) Int. Cl.
*B60Q 1/00* (2006.01)

(52) U.S. Cl. ................. 340/436; 340/426.1; 340/539.23; 340/541; 340/933

(58) Field of Classification Search ................... 340/435, 340/436, 426.1, 539.1, 541, 933, 539.23
See application file for complete search history.

(56) References Cited

U.S. PATENT DOCUMENTS

| | | | |
|---|---|---|---|
| 5,117,217 A | 5/1992 | Nykerk | |
| 5,528,217 A | 6/1996 | Adams | |
| 6,259,475 B1 | 7/2001 | Ramachandran | |
| 6,268,803 B1 | 7/2001 | Gunderson et al. | |
| 6,433,683 B1 * | 8/2002 | Robinson | 340/540 |
| 6,879,247 B2 * | 4/2005 | Shimomura et al. | 340/426.18 |
| 6,933,837 B2 * | 8/2005 | Gunderson et al. | 340/436 |
| 6,946,959 B2 * | 9/2005 | Wang | 340/539.22 |
| 7,048,423 B2 | 5/2006 | Stepanenko et al. | |
| 7,081,813 B2 * | 7/2006 | Winick et al. | 340/521 |
| 7,154,391 B2 | 12/2006 | Maki et al. | |
| 7,825,800 B2 * | 11/2010 | Cox | 340/541 |
| 2003/0222772 A1 | 12/2003 | Laufer | |
| 2006/0055529 A1 | 3/2006 | Ratiu et al. | |
| 2006/0064477 A1 | 3/2006 | Renkis | |
| 2006/0220843 A1 | 10/2006 | Broad et al. | |
| 2006/0226990 A1 | 10/2006 | Broad et al. | |
| 2006/0229086 A1 | 10/2006 | Broad et al. | |
| 2006/0250225 A1 | 11/2006 | Widmann et al. | |
| 2007/0132846 A1 | 6/2007 | Broad et al. | |
| 2007/0291689 A1 | 12/2007 | Kapur et al. | |
| 2010/0013933 A1 | 1/2010 | Broad | |

FOREIGN PATENT DOCUMENTS

| | | |
|---|---|---|
| EP | 1 298 007 | 4/2003 |
| EP | 1 720 142 | 11/2006 |
| GB | 2223870 | 4/1990 |
| JP | 2006 163659 | 6/2006 |
| WO | 95/01890 | 1/1995 |
| WO | 03/105100 | 12/2003 |
| WO | 2005/032882 | 4/2005 |

(Continued)

*Primary Examiner* — Hung T. Nguyen
(74) *Attorney, Agent, or Firm* — Volpe and Koenig P.C.

(57) ABSTRACT

A vehicle surveillance system has a plurality of side-light units mounted on opposite sides of a truck, bus, train or a similar long vehicle. The side-light units form an RF communication network on the vehicle. Each side-light unit comprises a day-running light source, a sensor for defining a surveillance zone on the side of said vehicle, said the sensor being arranged to detect an object or a movement of an object within the surveillance zone, and an RF transmitter which is controlled by said sensor and arranged to transmit an RF detection signal from said side-light unit. Existing day-running side-light units of a vehicle may be replaced with the inventive vehicle day-running side-light units.

37 Claims, 7 Drawing Sheets

FOREIGN PATENT DOCUMENTS

| WO | 06/085781 | 8/2006 |
| WO | 07/006514 | 1/2007 |
| WO | 07/027660 | 3/2007 |

\* cited by examiner

VEHICLE SURVEILLANCE AND COMMUNICATION SYSTEM

TECHNICAL FIELD OF THE INVENTION

The present inventive concept relates to the field of vehicle surveillance, such as vehicle intrusion detection or blind-spot detection, especially for relatively long vehicles such as trucks, trailers, buses and trains. The present inventive concept also relates to a general-purpose vehicle communication system.

BACKGROUND

Vehicles, such as trucks, are frequently used for transporting valuable cargo, such as electronics, computers and other goods that may easily be sold. Since the cargo often is transported over long distances, the trucks may be equipped with sleeping cabins, allowing the driver to park at the road-side and rest during the night, leaving the cargo essentially unattended. The problem of unattended valuable cargo in trucks is also present when trucks are left parked at fenced loading/unloading areas.

Unfortunately, theft of goods from such unattended trucks is a constantly increasing problem, resulting in great economical losses for companies and individuals using trucks for transporting goods. The extent of the problem has been a surprise to both the police and the freight business. However, this problem is not limited to trucks, but is also an issue for parked trailers, buses, railway-carriages and the like. Since the goods and valuables are left unattended there is unfortunately in many situations plenty of time for criminals to steal large amounts of valuable goods. Sometimes, the intruders simply drive off with entire trucks or trailers Trucks and trailers are often more vulnerable to the above problem than other types of vehicles since they often are equipped with fabric covers which can either be easily opened by an intruder or—if locked—easily cut open with sharp objects. One obvious solution to this problem is to use hard cargo covers which, however, has the drawback that a thief, trying to gain access to the cargo, only needs to force the locks at the back or the side doors of the truck or trailer.

Different kinds of alarm systems may be used to make it more difficult for an intruder to gain access to a vehicle. Different methods for detecting an intrusion have been described in the art.

EP-A1-1 720 142 discloses a vehicle security monitor system, including motion detectors for detecting a motion of an object within security zones of the vehicle and cameras for generating video images of the security zones. When the camera is activated, the captured images are shown on an onboard display.

WO 03/105100 A1 discloses a vehicle security system in which laser beams or IR beams are directed along the sides of the vehicle in order to detect any unauthorized approach to the vehicle. An alert to a security company may be provided via remote notification.

WO 95/01890 discloses a vehicle security system providing IR intrusion detection within a detection zone surrounding a vehicle. An IR sensor detects a thermal energy flux reflected or radiated from a direction of interest and produces an electrical input having an input signal level associated with the flux. An electronic circuit compares the input signal level with a pre-selected trigger level and produces an alert signal if the input signal level becomes equal to or greater than the trigger signal level. The electronic circuit further includes an alarm, such as a visual indicator or an audible signal, for receiving the alert signal and for producing a warning effect detectable by an occupant within the vehicle.

These prior-art security systems has the drawback that they require a substantial amount of extra equipment and wiring to the vehicle and are cumbersome to install on trucks and caravans, especially if the vehicle has a trailer.

SUMMARY

In the light of the above, it is an object to avoid or at least reduce the above-identified problems in the prior art.

A general object is to provide an improved surveillance system for trucks, trailers, buses, trains and similar long vehicles and an improved method for providing vehicles with a surveillance system.

These and other objects and advantages will become apparent in the following.

According to one aspect, there is provided a vehicle day-running side-light unit for use in a vehicle surveillance system comprising a plurality of such side-light units mounted on opposite sides of a vehicle, such as a truck, trailer, bus, train or a similar long vehicle. The side-light unit comprises a day-running light source, a sensor for defining a surveillance zone on the side of said vehicle, said sensor being arranged to detect an object or a movement of an object within the surveillance zone, and an RF transmitter which is controlled by said sensor and arranged to transmit an RF detection signal from said side-light unit.

Thus, there is provided what could be termed a "multi-function day-running side-light unit" for mounting on vehicles, such as trucks, trailers, busses or similar long vehicles.

In a preferred embodiment, the multi-function side-light unit further comprises an RF receiver. In a surveillance system comprising a plurality of such RF transmitting and RF receiving side-light units, the RF receiver allows the unit to communicate with a central control unit of the system and/or with other multi-function side-light units in the system and/or with external RF transceivers/receivers.

Furthermore, multi-function side-light units each incorporating both an RF transmitter and an RF receiver may be designed to implement a relay functionality in the system, according to which the multi-function side-light units are arranged to relay information by the use of RF signals. The relay function may operate in a direction towards a central unit and/or in a direction from a central unit.

Relayed RF signals may comprise information about a detected object or movement of an object within a surveillance zone of a side-light unit from which the RF signal originates.

Relayed RF signals may comprise alarm or control information from a central unit in the system to the side-light units in the system.

The relayed RF signals may also comprise other surveillance information, such as vehicle component status (brakes, etc).

Multi-function side-light units used for relaying signals in the surveillance system may be used for implementing a mesh communication network.

The inventive multi-function side-light unit may comprise an RFID means arranged to communicate with an external RFID unit. For instance, in a vehicle surveillance system comprising a plurality of such multi-function side-light units, the driver of the vehicle may carry such an external RFID unit in order to activate and de-activate the surveillance system.

Each side-light unit in the surveillance system may be arranged to activate its light source and/or to activate an audible alarm in the unit, in response to the side-light unit receiving an RF alarm signal, e.g. from a central unit in the system.

A side-light unit may comprise battery means arranged to enable autonomous operation of the side-light unit. Such a battery means enables the surveillance system to be active even if the light source of the unit is not powered, e.g. when the vehicle is parked at night. However, preferably the side-light unit is also connected to a conventional electrical system of the vehicle (i.e. the vehicle's generator and/or the vehicle's battery), especially when converting existing vehicles by replacing their conventional side-light units with the inventive units.

According to a further aspect there is provided a vehicle surveillance system comprising a plurality of vehicle day-running side-light units mounted on opposite sides of a vehicle, such as a truck, trailer, bus, train or a similar long vehicle. Each side-light unit comprises a day-running light source, a sensor for defining a surveillance zone on the side of said vehicle, said the sensor being arranged to detect an object or a movement of an object within the surveillance zone, an RF transmitter which is controlled by said sensor and arranged to transmit an RF detection signal from said side-light unit, and an RF receiver, whereby said plurality of side-light units form an RF communication network on said vehicle.

Thus, a plurality of multi-function side-light units may provide a surveillance system on a vehicle. The surveillance system may detect an object or a movement of an object within the surveillance zones of the multi-function side-light units. The side-light units will form nodes or node-points in the RF communication network on the vehicle.

The network may be used for operating the surveillance system, but may be used for different purposes at the same time.

In a preferred embodiment, the surveillance system further comprises a central unit arranged on said vehicle, said central unit comprising a central RF transmitter arranged to transmit central RF signals to at least one of the side-light units of the system, and a central RF receiver arranged to receive RF signals from at least one of the side-light units of the system.

The central unit may be arranged, in response to an incoming RF detection signal from one or more side-light units of the system, to transmit a central RF alarm signal to all of the side-light units of the system.

The central unit may be arranged to transmit said central RF alarm signal only if one or more criteria have been met. One criterion may be that the central unit has received RF detection signals from at least two adjacent side-light units of the system. Another criterion may be that the central unit has received at least two consecutive RF detection signals from one and the same side-light unit during a predetermined time interval, which may preferably be programmable. If the system is to be used as a blind-spot detection system, a criterion may that a blinker of the vehicle is being activated on the same side of the vehicle on which an object or movement of an object has been detected.

Each side-light unit of the system may be arranged to operate its light source and/or an audible alarm in the unit in response to the side-light unit receiving said central RF alarm signal from the central unit.

In the inventive surveillance system, each side-light unit may be arranged, in response to the side-light unit receiving a central RF alarm signal, to relay the received central RF alarm signal to one or more other side-light units of the system.

The inventive surveillance system may operate as a stand-alone system, but may also be designed to communicate with one or more other such surveillance system arranged on other vehicles. For instance, if several vehicles, each provided with such a system, are parked adjacent to each other, the respective systems may communicate with each other in such a way that an intrusion at one of the vehicles will generate an alarm in all of the vehicles in the "group".

According to a third aspect, there is provided a communication system comprising a plurality of vehicle day-running side-light units mounted on opposite sides of a truck, trailer, bus, train or a similar long vehicle, wherein each side-light unit comprises a day-running light source, an RF transmitter arranged to transmit RF signals and an RF receiver arranged to receive RF signals, said plurality of side-light units forming an RF communication network on said vehicle.

According to this aspect, the sensor needs not to be included in the side-light unit. Such a communication system could be considered as a general-purpose communication system that may be used for a variety of purposes and applications, as will be discussed in the following. The system may for instance be used for monitoring vehicle status, for communication with external RF equipment, etc. The communication system being built up of a plurality of communicating nodes will enable efficient and reliable data communication onboard the vehicle.

In accordance with a fourth aspect, the inventive concept relates to the use of vehicle day-running side-light units mounted on opposite sides of a truck, bus, train or a similar long vehicle as nodes in a wireless communication network for providing a wireless communication network on said vehicle.

The above and other features and advantages will be more described and illustrated in connection with the following description and in the claims.

BRIEF DESCRIPTION OF THE DRAWINGS

A more detailed understanding may be had from the following description, given by way of example in conjunction with the accompanying drawings wherein.

DETAILED DESCRIPTION

In the following section a detailed description of embodiments and applications of the inventive concept will be given with reference to the drawings.

Figure 1:
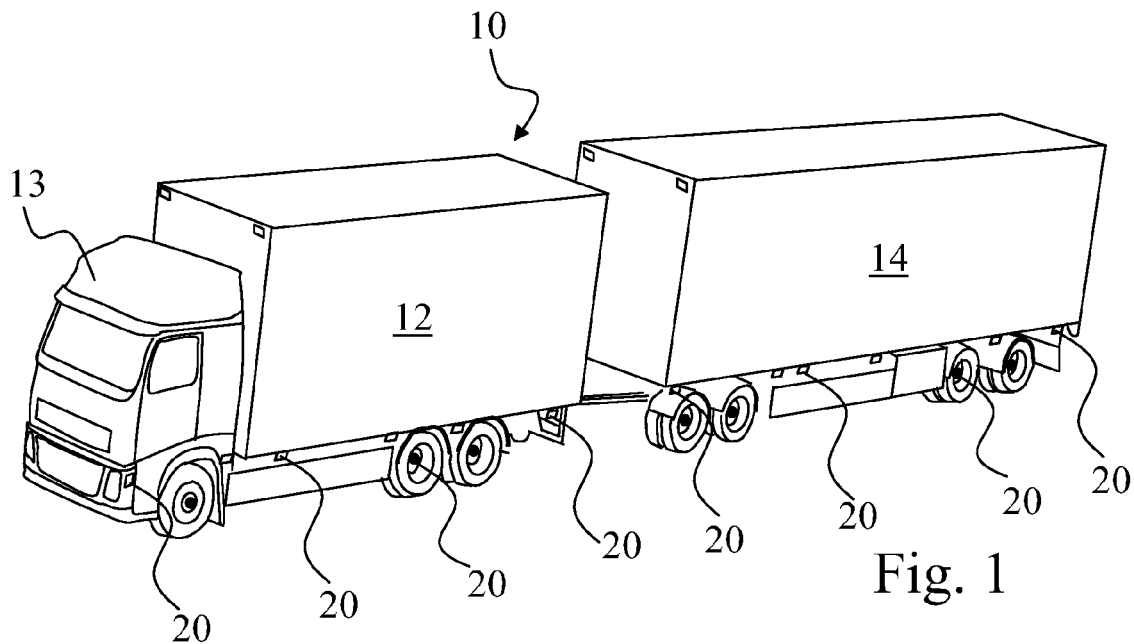
FIG. 1 illustrates a vehicle provided with a surveillance system according to an embodiment of the invention.

An embodiment of a vehicle surveillance system will now be described. FIG. 1 discloses a vehicle 10 which in this example is in the form of a truck 12 and a trailer 14. The vehicle 10 is provided with a surveillance system in accordance with an embodiment of the inventive concept.

Figure 2:
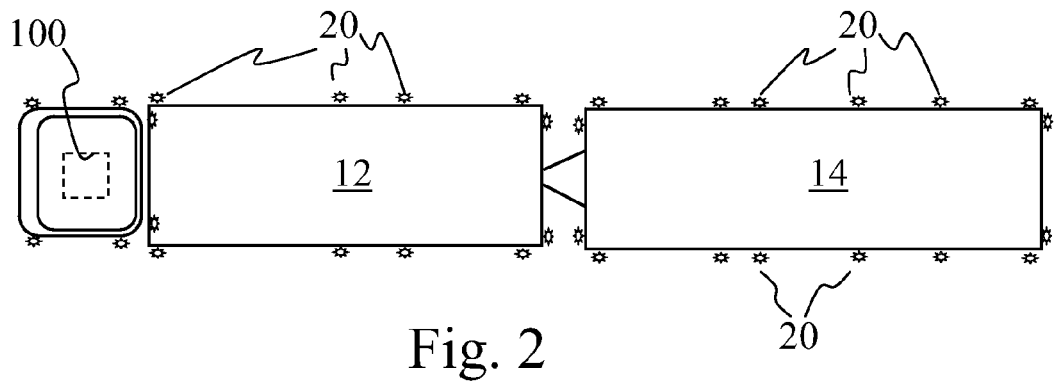
FIG. 2 is a top-view of the vehicle in FIG. 1.

The surveillance system comprises a plurality of multi-functional day-running side-light units 20 mounted on the truck 12 and the trailer 14 at opposite sides thereof, as illustrated in FIGS. 1 and 2. The side-light units 20 may be installed during the manufacture of the vehicle 10. However, an essential advantage is that an existing vehicle which already is provided with conventional day-running side-lights (e.g. due to law requirements) may be quickly "converted" into a vehicle having a surveillance system, simply by replacing the conventional side-light units with the multi-functional side-light units, and using the existing mounting positions and electrical infrastructure of the vehicle.

Figure 4:
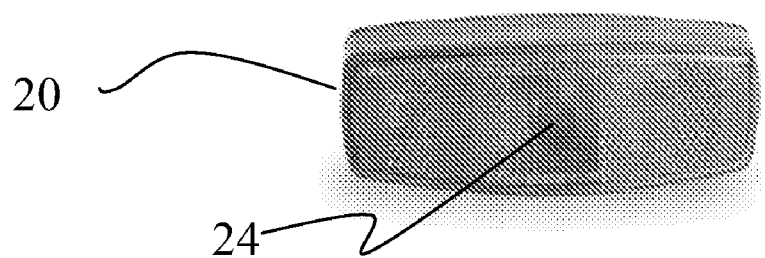
FIG. 4 is a front view of a day-running side-light unit according to an embodiment of the invention.

An embodiment of a multi-function side-light unit 20 will now be described with reference to FIGS. 4 to 6b. Optionally, the side-light unit 20 has an outer appearance essentially identical to the outer appearance of a conventional side-light unit, as shown in FIG. 4. However, the side-light unit 20 may also have another outer appearance differing from conventional side-light units.

Figure 5:
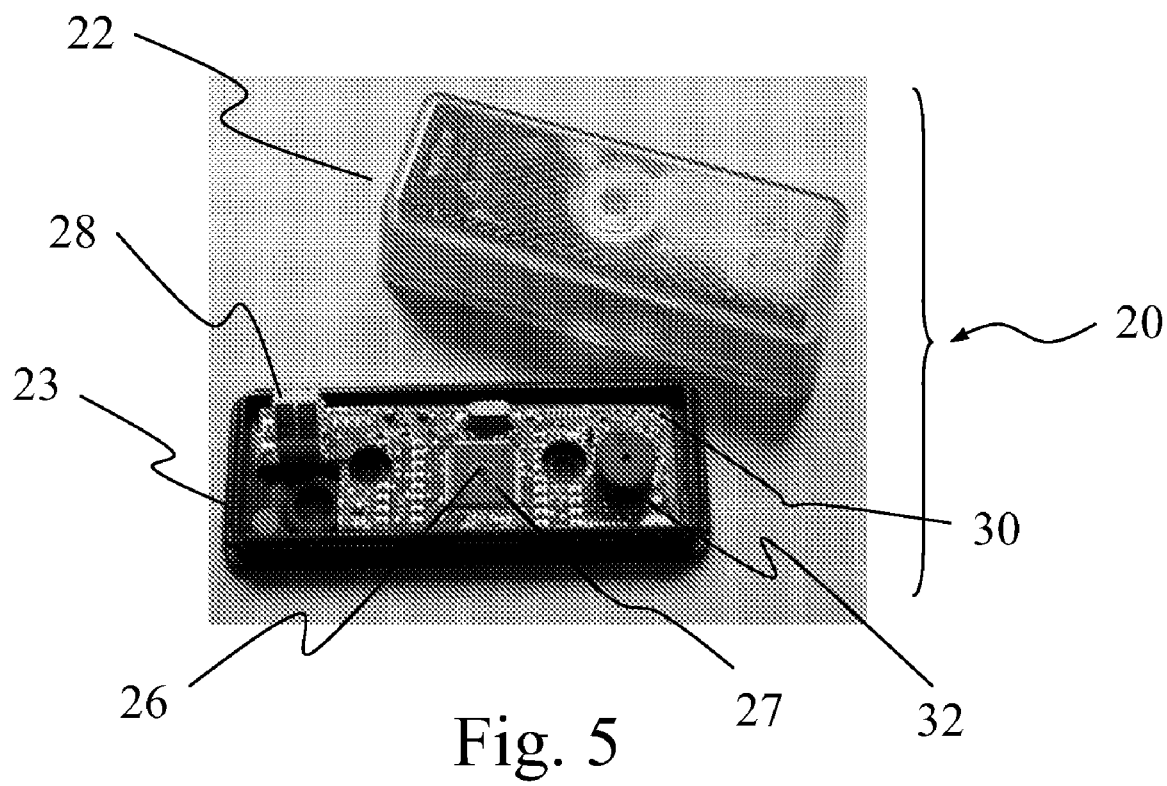
FIG. 5 illustrates the side-light unit in FIG. 3 in a disassembled condition.

FIG. 5 illustrates the side-light unit 20 in a disassembled condition, comprising a transparent cover 22 and a base 23 to be mounted on the vehicle 10. Preferably, the base 23 may be provided with standard electrical wiring and connectors (not shown) for connecting the side-light unit 20 to an electrical infrastructure of the vehicle 10, without any constraints regarding polarity.

Figure 6:
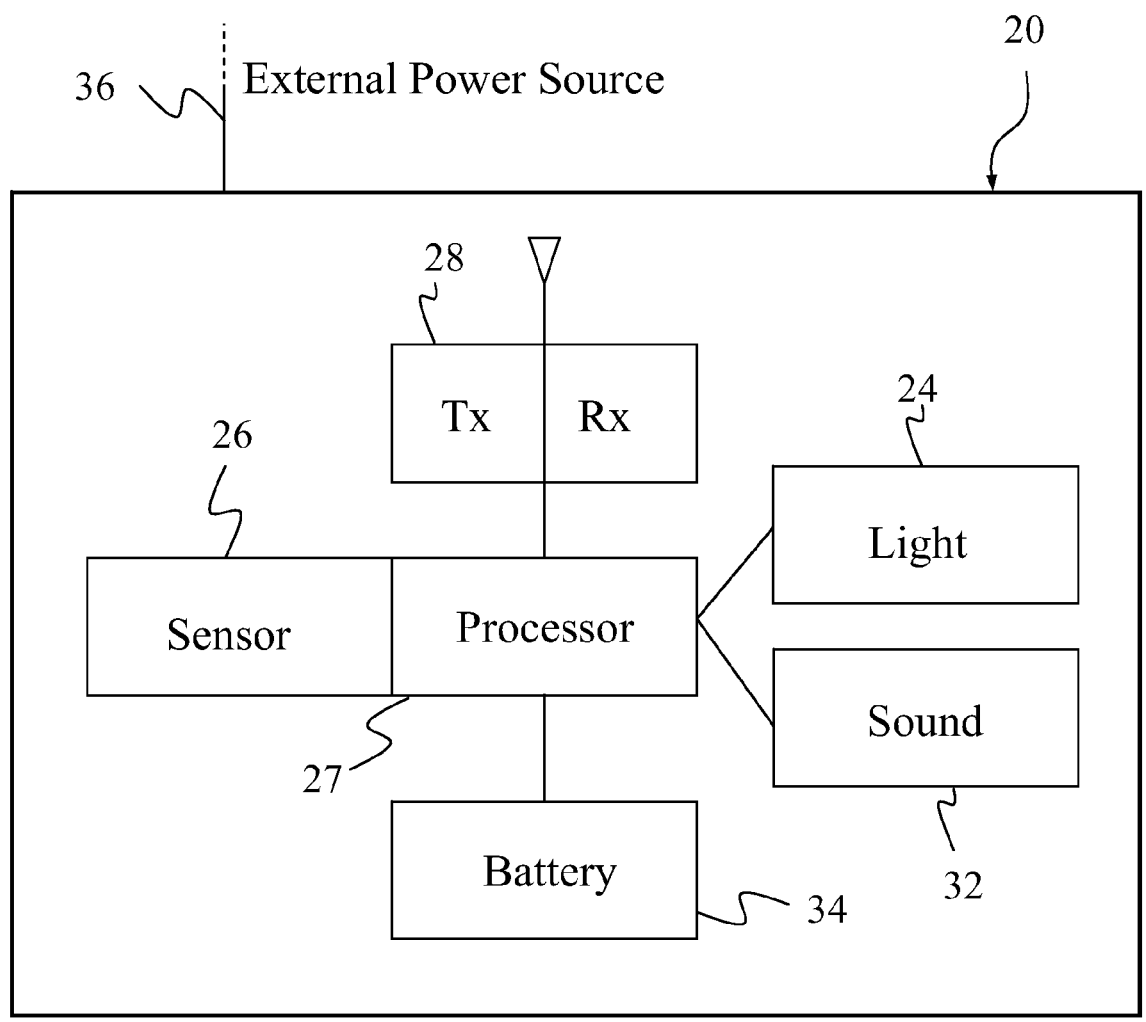
FIG. 6 is a block diagram of an embodiment of a side-light unit.

FIG. 6 is a block diagram of an embodiment of the side-light unit 20. In the disclosed embodiment, the side-light unit 20 comprises a day-running light source 24, a sensor 26 and an RF transceiver 28 including an RF transmitter and an RF receiver. An electrical circuit or processor 27 inside the unit 20 supports the sensor 26 and the RF transceiver 28. Optionally, each unit 20 may be provided with a sound generator, a buzzer, a hummer, or other similar device 32 for generating an audible alarm.

Additionally, the multi-function side-light unit 20 may include a rechargeable a battery 34. The battery 34 may be used to power the light source 24, the sensor 26 and the RF transceiver 28 when the vehicle is parked. The battery 34 may be recharged when the engine of the vehicle is running. The battery 34 provides the advantage of enabling autonomous operation of the multi-function side-light unit 20. The multi-function side-light unit 20 may also be at least partly powered directly by the ordinary electrical infrastructure of the vehicle (i.e. the vehicle's generator and/or the ordinary vehicle battery, e.g. 12 volt, 24 volt, etc), schematically indicated in the FIG. 6 as "external power source 36".

The day-running light source 24 may be in the form of an LED or any other conventional type of light-emitting device. As conventional, and as frequently required by national regulations, the light source 24 provides a constant noticing side-light, thereby increasing the visibility of the vehicle 10. Depending on national regulations, all or some of these lights may be lit during driving for providing a constant noticing light to the surrounding.

In use, each sensor 26 is arranged to define a surveillance zone 50 (see FIG. 3) on the side of the vehicle 10 for the detection of an object or a movement of an object within the surveillance zone 50. Non-limiting examples of sensor types are ultrasonic sensors, IR sensors, Doppler sensors, radar sensors or any range-finding detector or motion detector well-known in the art.

If an ultrasonic sensor is used, objects may be detected within a detection zone of the sensor by the sensor 26 transmitting ultrasonic pulses and listening for an ultrasonic echo. The ultrasonic sensor 26 may apply a unique code or modulation to the ultrasonic pulses. This enables the ultrasonic sensor to distinguish between echoes from its own transmitted ultrasonic pulses and echoes of other ultrasonic pulses. In response to detecting an ultrasonic echo, the ultrasonic sensor may generate and output an electrical signal.

Figure 3:
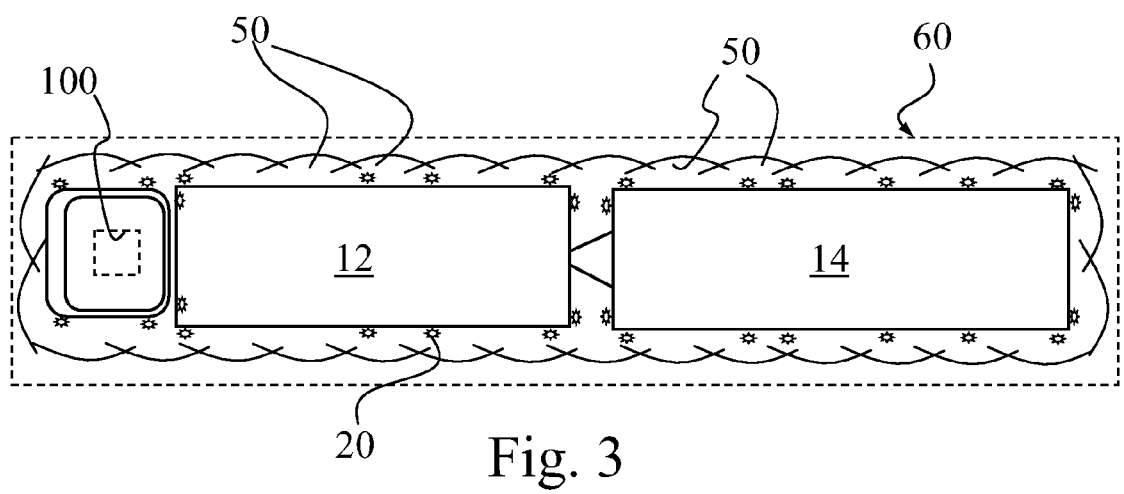
FIG. 3 schematically illustrates overlapping surveillance zones of the surveillance system in FIG. 1.

FIG. 3 is a top-view illustrating the activated surveillance system. The multi-function side-light units 20 are mounted such that at least some of the individual surveillance zones 50 overlap, thereby forming a collective surveillance zone 60 surrounding the vehicle 10. If needed to establish a continuous zone 60 also at the front and at the rear, the vehicle 10 may be provided with multi-function side-light units 20 also at the front and at the rear, as illustrated in FIG. 3.

It should especially be noted that the overlap ensures that the collective surveillance zone 60 surrounds the vehicle 10 even if the trailer 14 is at an angle with the truck 12. The surveillance system is thus arranged to detect an object or movement of an object within the collective surveillance zone 60. The collective surveillance zone 60 may be regarded as an invisible "fence" around the vehicle 10.

In the disclosed embodiment, the sensor 26 comprises logic for processing sensor data. The logic may be implemented in the form of a programmable controller 27 such as a microcontroller or any other conventional processor unit or control circuit. It may further comprise a read/write memory for storing data, instructions and similar. It may further comprise both data inputs and outputs to enable communication with other components, e.g. the light source 24, the transceiver means 28 etc.

The logic 27 may enable the sensor 26 to distinguish between static and moving objects by comparing consecutive measurements. The instructions may also enable the sensor 26 to determine the distance to detected objects. It may further determine if an object detected by the sensor 26 is within the surveillance zone 50 of the sensor 26.

The term "surveillance zone" does not necessarily correspond to the total detection zone of the sensor 26, i.e. the zone in which the sensor 26 is able to detect objects or motion of an object. In contrast, the surveillance zone 50 may in some instances be equal to the zone in which the sensor 26 will respond to detected objects. In such cases, the surveillance zone may be set by a central unit 100 as will be further described below.

The sensor 26 may further comprise logic for increasing a detection counter by one each time the sensor 26 detects an object within the surveillance zone 50. If the detection counter exceeds a set value, an RF Detection signal RFD is transmitted from the multi-function side-light unit 20, otherwise no signal is sent. The detection counter may be restored to zero when no object or motion has been detected for a time interval. This mechanism may be used to avoid transmitting RF detection signals in response to objects entering and leaving the surveillance zone 50 only briefly. Other techniques for requiring a threshold amount of motion for a threshold period of time will be obvious to those skilled in the art.

It should be understood, that although the logic 27 of the sensor 26 has been described to reside in the sensor 26, some or all functionality may also be implemented in one of several microcontrollers external from the sensor 26.

In the disclosed embodiment, the RF transceiver 28 of the multi-function side-light unit 20 comprises both an RF transmitter (Tx) and an RF receiver (Rx). The RF transmitter and the RF receiver may implement any RF communication protocol such as ZigBee, Bluetooth, IEEE 802.xx (including IEEE 802.11s), CAN or any other conventional wireless communication technology suitable for providing wireless communication. The RF receiver and the RF transmitter may comprise logic and data structures for implementing routing/relaying functionality and/or any of the above-mentioned communication protocols, thus enabling the multi-function side-light unit 20 to operate as a node in the wireless network formed on the vehicle 10.

Optionally, the RF transceiver 28 may comprise a MAC (Media Access Control) address to be used for enabling identification of the RF transceiver 28 during communication. However, such identification may be provided by other means, such as a software implemented ID, static network addresses, IP addresses or similar.

The RF transmitter is preferably arranged to transmit an RF signal from the side-light unit 20 in response to the RF receiver of the side-light unit 20 receiving an incoming RF signal from another side-light unit 20 in said system.

The RF signal may, depending on the communication protocol used in the communication network, comprise a plurality of data blocks. Each data block may comprise a header portion, a data portion and a checksum portion. The header portion may comprise a destination address, a sender address, the MAC address of the sender, message type etc. The message type may, for example, be a "detection message" transmitted by a multi-function side-light unit 20 if an object is detected within its surveillance zone 50, or an "alarm message" transmitted by the central unit 100 to instruct the receiving multi-function side-light units 20 to activate their light sources 24. Further alternatives are also possible and well-known in the art.

The RF transmitter may be controlled by the sensor 26 and arranged to transmit an RF detection signal RFD from the side-light unit 20. The RF transmitter is further arranged, in response to receiving an incoming RF signal from a second side-light unit in the system, to transmit an outgoing RF signal from the first side-light unit to a third side-light unit in said system.

Figure 7A:
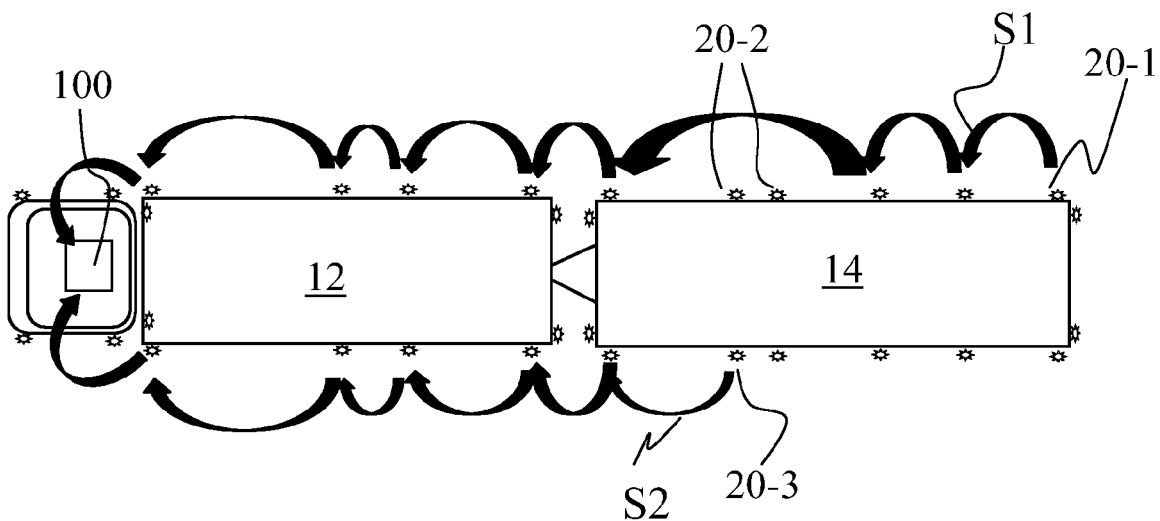
FIGS. 7a and 7b schematically illustrate a relay function of the surveillance system in FIG. 1.

In a preferred embodiment, the surveillance system further comprises the central unit, schematically illustrated in FIGS. 3 and 7*a* at reference numeral 100. The central unit 100 may preferably be arranged within the cabin 13 of the truck 12, but may for certain applications be located at another location in the vehicle 10.

The central unit 100 may be a computer such as an Onboard Computer (OBC) or Personal Digital Assistant (PDA), laptop or similar. The central unit 100 implements logic for processing data and controlling the operation of the surveillance system 100. The logic may be in the form of processor instructions stored in a memory of the central unit 100 or stored and executed by a microcontroller or similar.

The central unit 100 comprises an RF transmitter arranged to transmit RF signals to at least one of the multi-function side-light units 20 of the system, and an RF receiver arranged to receive RF signals from at least one of the multi-function side-light units 20. Said RF receiver and said RF transmitter may be implemented by any RF communication protocol such as ZigBee, Bluetooth, WLAN, CAN or any other conventional wireless communication technology suitable for providing wireless communication. Regardless of protocol, the RF receiver and the RF transmitter preferably comprise logic and data structures for implementing routing/relaying functionality and/or any of the above-mentioned communication protocols, thus enabling the central unit 100 to operate as a node in the wireless communication network formed on the vehicle 10.

The wireless communication network set up by the side-light units 20 and the central unit 100 enables bi-directional wireless communication (i) between multi-function side-light units 20 and (ii) between multi-function side-light units 20 and the central unit 100.

The signals may relate to surveillance information but may also be used to communicate any kind of information and data. The multi-function side-light units 20 and the central unit 100 thus operate as nodes in the wireless network.

By using the side-light units 20 as relay nodes, RF signals may be transmitted in the communication network between the nodes/units 20 along the vehicle 10 even if all of the nodes are not within RF transmission range of each other. As a first non-limiting example, FIG. 7*a* schematically illustrates how an RF signal S1 is being generated at and relayed from a rear-most multi-function side-light unit 20-1. The signal S1 is relayed to the central unit 100 via a number of intermediate multi-function side-light units 20. FIG. 7*a* also schematically illustrates how the signal S1 in a meshed network may take different routes in case some units 20-2 for some reason are not working. Thus, if a node is removed or damaged, the network may be dynamically updated, allowing an RF signal to be relayed via another multi-function side-light unit 20 instead. The update may be accomplished by transmitting broadcast signals or by other techniques implemented in the above-mentioned protocols, well-known in the art FIG. 7*a* also schematically illustrates how another RF signal S2 may be generated at another unit 20-3 along the vehicle 10.

Figure 7B:
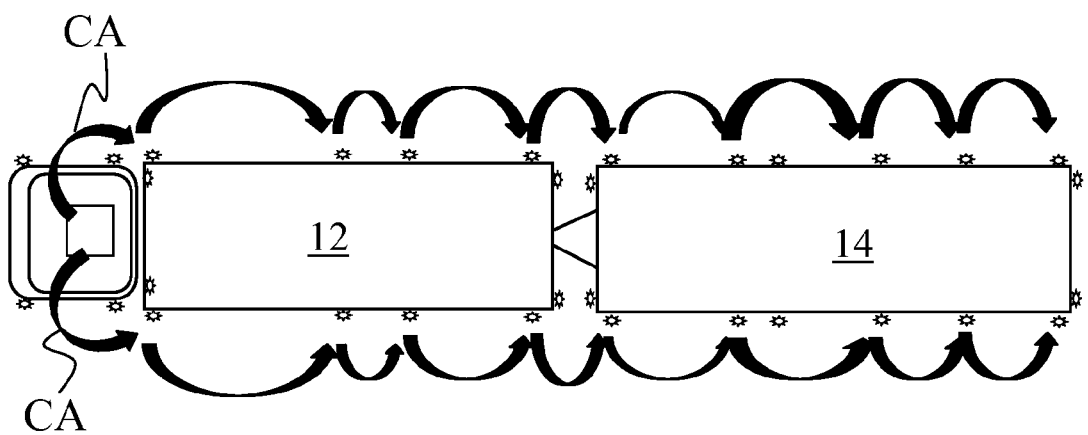

As illustrated in FIG. 7*b*, the relaying may also be carried out in the opposite direction, i.e. from the central unit 100 to the multi-function side-light units 20. This may especially be the case if the central unit 100 is to transmit some alarm activation signal to all of the units 20, as will be described below.

The central unit 100 may be arranged to activate alarms in the units 20 by transmitting a central RF alarm signal CA to the multi-function side-light units in response to receiving an RF detection signal RFD from a multi-function side-light unit 20 of the system. Optionally, the central unit 100 may also be arranged to activate e.g. the head-lights or other lights of the vehicle 10 or to transmit an alarm signal to a remote security center via e.g. GPRS/3G or GSM cellular network.

The central unit 100 may be arranged to activate alarms if one or more alarm criteria are met. A criterion may for example be that RF detection signals RFD have been received by the central unit 100 from at least two adjacent the side-light units 20. Another criterion may be that at least two consecutive RF detection signals RFD are received by the central unit 100 from a side-light unit during a specified or predetermined time interval, which may preferably be programmable.

The criterion may for example be implemented as follows: the central unit 100 stores a table with entries of the MAC addresses or IP addresses of the RF means 28 of each multi-function side-light unit 20 together with the location of the respective unit. The table may further comprise a detection counter for the multi-function side-light units 20. Each time an RF detection signal RFD is received by a multi-function side-light unit, the detection counter is increased by one. The detection counter is restored to zero when a side-light unit has been inactive for a time interval. The criterion for activating an alarm may thus be that a detection counter exceeds a set value. The criterion may also be that the detection counters of at least two adjacent multi-function side-light units exceed a set value simultaneously. Such criteria may be used to avoid activating alarms in response to persons entering and leaving the surveillance zone only briefly.

It should be understood that these specific criteria only are given by way of example and that a plurality of further criteria are possible without departing from the inventive concept. It should further be noted that this functionality may reside in the central unit 100 alone, in the multi-function side-light units 20 alone, or a combination thereof.

The above described surveillance system has two basic modes of operation. The operation of each mode will now be described separately.

In the first mode of operation, the surveillance system is arranged to detect intrusion in the collective surveillance zone 60 and to activate one or more alarm functions in response to an intrusion. This mode may preferably be used when the vehicle 10 is parked.

During system activation, the central unit 100 transmits an RF activation signal to all multi-function side-light units 20 for initializing the surveillance system. The RF activation signal may instruct the sensors 26 to set the surveillance zone to a range value. The range value determines how large the surveillance zone will be. Finally, each side-light unit 20 starts to survey its detection zone 50. The central unit 100 may further be arranged to occasionally transmit RF polling signals requesting the multi-function side-light units 20 to report their status. The central unit 100 may thus ensure that the surveillance system 100 is operating correctly.

If an intruder enters the detection zone 50 of a sensor 26, a detection signal is generated which the sensor 26 processes to determine if the intruder is within the surveillance zone 60 or not. The determination may be made by simply comparing the measured distance to the intruder with the range value received from the central unit 100. If it is not, the detection will be ignored.

If the intruder is determined to be within the collective surveillance zone 60, i.e. the invisible fence has been broken, an RF detection signal RFD is transmitted via the RF transmitter of the detecting multi-function side-light unit 20 to the central unit 100. As have been previously described, the sensor 26 may also evaluate if a criterion has been met to determine if the RF detection signal should be transmitted. The RF detection signal RFD may be relayed via intermediate multi-function side-light units 20 to the central unit 100 as have been previously described. The RF detection signal may also be directly transmitted to the central unit 100, especially if the detecting side-light unit is located close to the central unit.

The central unit 100 receives the RF detection signal RFD. The multi-function side-light unit 20 from which the RF detection signal RFD originates may be identified by its MAC address or IP address. Furthermore, the central unit 100 may determine if an alarm criterion is met. For instance, testing if more than one multi-function side-light unit have reported an intrusion recently, or has this specific multi-function side-light unit reported additional intrusions recently.

If the alarm criterion has been met, the central unit 100 transmits a central RF alarm signal CA to (preferably all) the multi-function side-light units 20. The central RF alarm signal CA is received, directly or via relay function, by each multi-function side-light unit 20. In response thereto, each multi-function side-light unit 20 activates its light source 24 and its audible alarm 32. The light source 24 may provide a constant alarm light or a blinking alarm. The blinking frequency may be transmitted in the central RF alarm signal CA. Furthermore, the multi-function side-light unit 20 which has detected the intrusion may receive a specific RF alarm signal instructing the multi-function side-light unit to use a specific blinking frequency (e.g. higher or lower). This facilitates identification of what caused the detected intrusion and where it occurred.

The central unit 100 may further activate the horn of the truck 12 or other light-equipment than the multi-function side-light units 20 on the vehicle 10. The central unit 100 may also transmit an intrusion signal to a remote receiver e.g. at a security company or the police. The intrusion signal may be transmitted via GPRS, GSM or other cellular communication technology. If the system comprises a GPS equipment, the intrusion signal may also comprise the GPS coordinates of the current vehicle position.

The activation of the alarm will thus alert the surrounding that an intruder has been noticed and further scare off the intruder.

To summarize, an RF detection signal RFD is transmitted from one or more multi-function side-light units 20 detecting an object or motion of an object within its surveillance zone. The RF detection signal RFD is received by the central unit 100. In response thereto, the central unit 100 transmits a central RF alarm signal CA to the multi-function side-light units 20. In response thereto, each side-light unit 20 activates its day-running light source 24 and/or its audible alarm 32.

Figure 8:
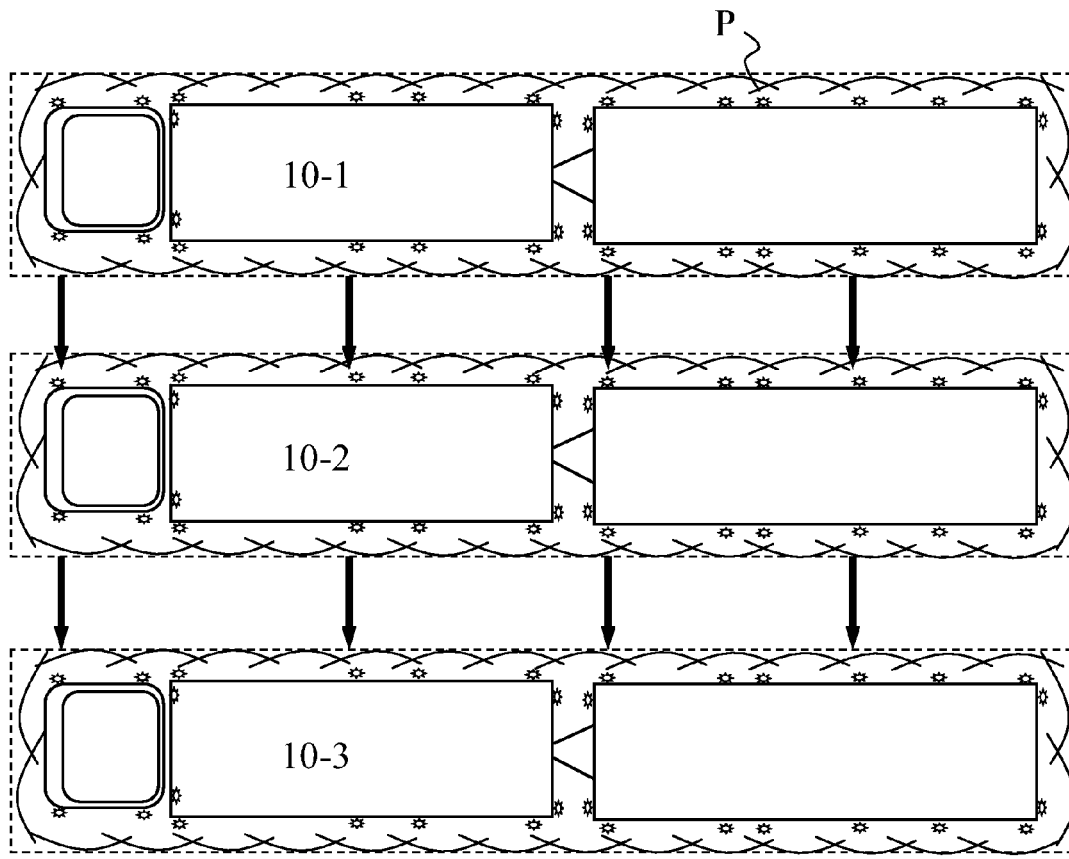
FIG. 8 schematically illustrates a plurality of communicating surveillance systems operating in parallel.

According to a further embodiment, two or more surveillance systems may operate in conjunction, as illustrated in FIG. 8 where three vehicles 10-1, 10-2 and 10-3 are parked next to each other. The central units 100 of the respective surveillance systems are configured to allow communication between the networks of the three individual surveillance systems (black arrows in FIG. 8), thus forming an enlarged communication network for the three vehicles.

In response to a detected intrusion at say vehicle 10-1 (as indicated at position P) the originating RF detection signal RFD is relayed from position P to at least one of the central units 100, optionally all of the three central units. An alarm may then be activated by: (1) each central unit transmitting an RF alarm signal to the multi-function side-light units of its surveillance system (2) one central unit transmits an RF alarm signal to the multi-function side-light units of all surveillance systems or (3) a combination of (1) and (2).

The RF signals may be transmitted between the surveillance systems via communicating multi-function side-light units or directly between the central units.

Figure 9:
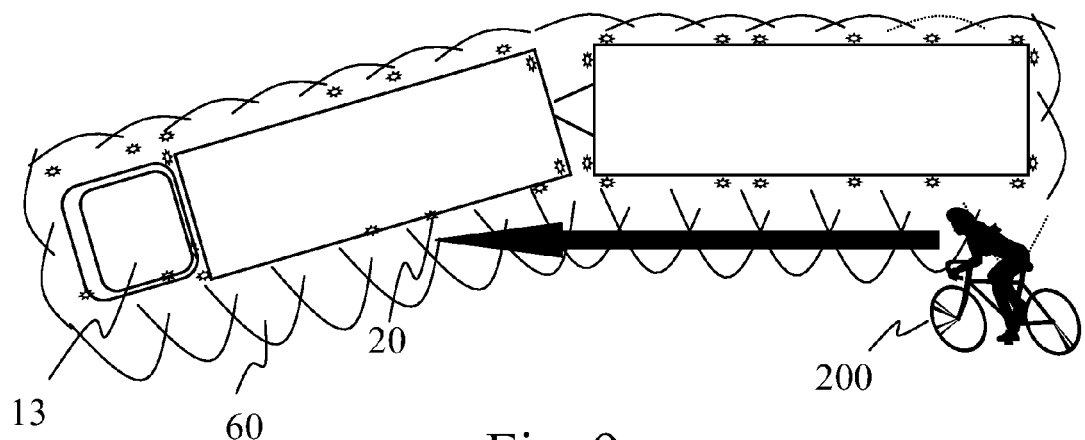
FIG. 9 illustrates a blind-spot application of a surveillance system.

The second mode of operation of the surveillance system—blind spot detection—will now be described with reference to FIG. 9. The surveillance system 100 is activated and is arranged to detect an object or detect motion of an object 200, such as another vehicle, a bicycle, a pedestrian or similar, within the surveillance zone 60.

Preferably, the sensors 26 are arranged to detect both static objects and moving objects, thus enabling the surveillance system to detect both objects in motion relative to the reference system of the vehicle 10 and also to detect objects stationary relative to the reference system of the vehicle 10, e.g. a vehicle traveling alongside with the vehicle at the same speed. The surveillance zone is preferably set to cover the adjacent lanes of the road.

One or more of the multi-function side-light units detect the object 200 or movement of the object within the surveillance zone and transmit an RF detection signal which is received by the central unit 100. The central unit determines if a criterion has been met. According to this embodiment, the criterion is could be that a vehicle blinker has been activated on the same side of the vehicle as the "detection side".

If the blinker is activated, the central unit may preferably activate an audible and/or visual indicator within the driver's cabin 13 to warn the driver of the danger, thereby avoiding an accident. In addition, the central unit 100 may communicate with the side-light units 20 as described in the first mode of operation.

While the multi-function side-light units 20 in the above-described embodiments present both RF transmitting capability and RF receiving capability, in another alternative all multi-function side-light units do not have to present RF receiving capability. In a surveillance system, such a multi-function side-light unit may transmit its RF detection signal RFD directly to the central unit 100 or via multi-function side-light units comprising both an RF receiver and an RF transmitter.

The wireless vehicle communication network provided by the multi-function side-light units 20 may advantageously be used to transmit other types of information and data and may be used for a plurality of different applications. Further, the inventive concept is not limited to a specific network technology. Any wireless network technology may be used.

Figure 10:
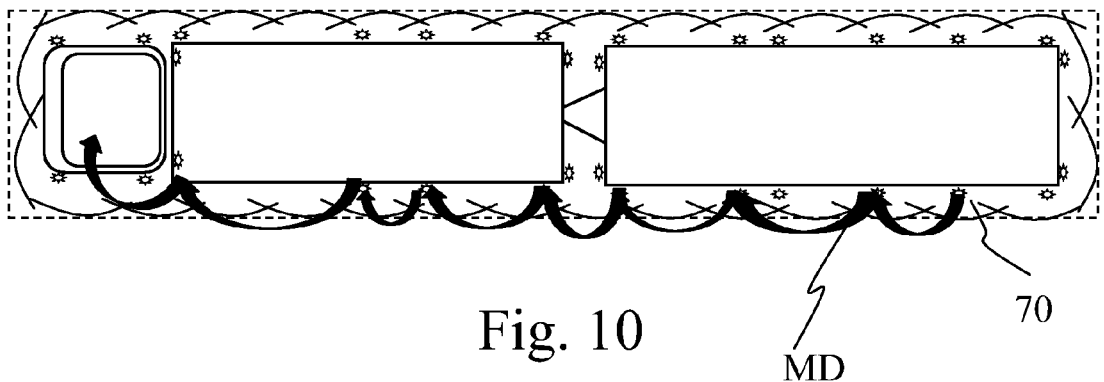
FIG. 10 illustrates vehicle status monitoring application.

For example, as schematically illustrated in FIG. 10, the network may be used to wirelessly communicate output measurement data from sensors that are e.g. continuously checking the vehicle status. For instance, a temperature sensor 70 for sensing bearing temperature may be mounted at the vehicle bearings and may be provided with an RF transmitter compatible with the RF receiver of the multi-function side-light units 20. The temperature measurement data MD is transferred from the sensor 70 via the wireless system to e.g. the cabin 13.

Other monitoring is also possible, such as monitoring the tire pressure or transferring video images wirelessly to the cabin from a camera mounted on the vehicle.

Figure 11:
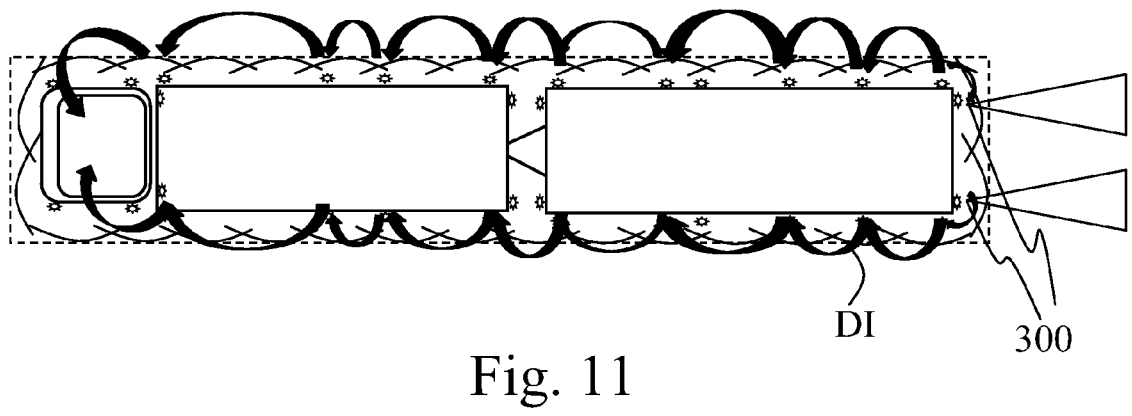
FIG. 11 illustrates a further application of a surveillance system.

Range-finding detectors, e.g. ultrasonic sensors 300 in FIG. 11, may be mounted on the rear section of the truck or trailer, to measure the distance to e.g. a loading/unloading terminal and transmit this distance information Di wirelessly to the central unit. This information may be presented to the driver during backing up of the truck and trailer.

According to another application of the wireless communication network, sensors provided with RF transmission means may be mounted at the back doors for detecting if the back doors are open or closed. These may be used to alert the driver if he attempts to drive away during loading and unloading, which is a very common cause for accidents in the freight industry.

According to another application of the wireless communication network, intrusion detectors and RF transmitters on the diesel or petrol tank of a vehicle and transmit an RF detection signal if an intruder tries to tamper with the tank.

An advantageous feature of the inventive wireless network is identification of individual multi-function side-light units 20 comprising identification means. This may be used to render use of stolen multi-function side-light units more difficult. For instance, the central unit 100 may be designed not to grant a multi-function side-light unit access to the network if the MAC address is not recognized. Optionally, when the surveillance system is initially installed on a vehicle, all units may be put into an initialization state, waiting for an initial RF signal comprising identification information of the other neighboring side-light units. The identification information could be stored in each side-light unit and used for determining if the RF receiver or the RF transmitter should be deactivated or not.

As an alternative, the granting may be based on the value of a control flag (e.g. one or more control bits or similar) in the RF signals received from the multi-function side-light units. The control flag may indicate a "new" and a "used" state. During a normal installation of a side-light unit, the central unit receives an RF signal and extracts the corresponding state information from the received RF signal. If the control flag indicates a "new" state the side-light unit is accepted. The side-light unit then changes its control flag to the "used" state. However, if the control flag during installation indicates a "used" state, the central unit will not accept the side-light unit to form part of the surveillance system. Preferably, the control flag may only be initialized to the "new" state through a protected restoration procedure, thus making it more difficult to use stolen units.

Furthermore, the inventive wireless network may be used to wirelessly transfer CAN data between for example a trailer and a truck. Thus, the wires between the truck and trailer which are needed in a conventional system may be dispensed with. The CAN data may be transmitted as raw data. The CAN data may also be transmitted as encapsulated data. Preferably, the CAN data transmission is occasionally temporarily halted to allow the multi-function side-light units to access the transmission medium.

In another application, the inventive wireless communication network may be used to transmit and receive transportation payment information, delivery information or traffic information from stationary transceivers at the roadside.

Figure 12:
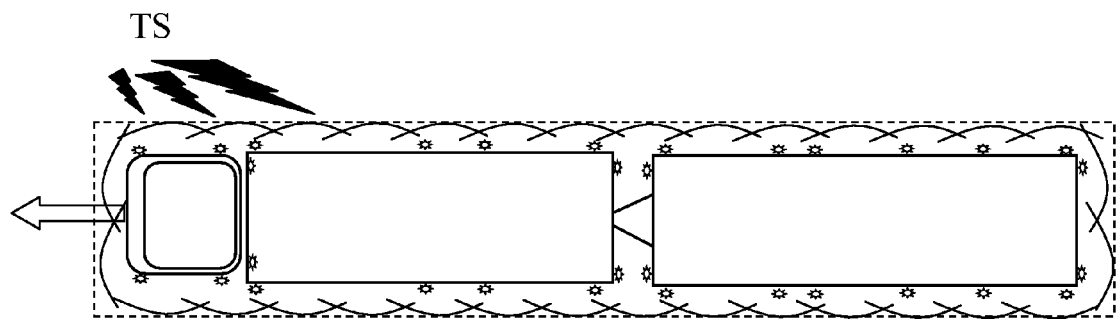
FIG. 12 illustrates another application of a surveillance system.

FIG. 12 schematically shows a vehicle equipped with a surveillance system communicating with a roadside transceiver station TS. In conventional technology, the vehicle usually comprises a single RF transceiver to communicate with roadside transceiver stations. The vehicle and roadside station thus only get one attempt to communicate with each other. Consequently, to ensure successful communication the transmission power must be relatively high.

In contrast, the inventive wireless communication system, provided by the plurality of multi-function side-light units 20, will be much more effective and reliable. Due to the placement of the RF means in the multi-function side-light units 20, a longer time-window for transmitting information is ensured. Further, since the RF signals may be relayed within the network, any of the multi-functional side-light units 20 may carry out the communication with the roadside transceiver station TS. As a result, the vehicle and the transceiver station TS have several connection opportunities.

According to one embodiment, at least one of the plurality of multi-function side-light units are provided with RFID readers. The RFID reader may be any commercially available RFID reader. The RFID reader may be provided as a separate RF unit or the RF transceiver means 28 may include RFID reading functionality. The RFID reader allows RFID information to be received by any multi-function side-light unit of the surveillance system and wirelessly transmitted to the central unit 100. The RFID information may be transmitted as encapsulated data within the RF signals or as raw data.

Figure 13:
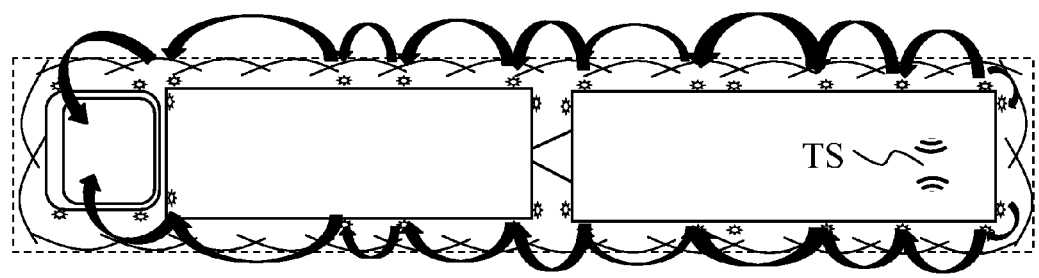
FIG. 13 illustrates yet another application of a surveillance system.

The RFID readers enable the communication network to be used in a plurality of further applications. According to one application illustrated in FIG. 13, RFID information from RFID tagged cargo TC may be wirelessly transmitted, via the side-light units 20, to the central unit in the cabin during loading and unloading. The information may be used to ensure that the correct cargo is being loaded and unloaded at the correct location.

For example, if the central unit receives information indicating that cargo is loaded or unloaded, the cargo ID may be checked against entries of a database comprising entries with cargo ID and their corresponding loading/unloading location (e.g. in the form of GPS coordinates or other location information). If the location of the vehicle doesn't match the loading/unloading location in the database, the central unit may activate notification means to inform the driver, the loader/unloaded or a remote host.

According to a further application, the driver of the vehicle may carry an RFID tag with a trusted ID or code known to the inventive system. Any RFID reader of the surveillance system receiving the ID may forward the ID to the central unit 100. If the ID matches the trusted ID, the surveillance system is deactivated by the central unit 100. Correspondingly, the surveillance system 100 may be automatically activated if no RFID reader of the surveillance system 100 detects a presence of the specific RFID tag during a time interval. Compared to prior-art key-less solutions for locking/unlocking cars, this provides the advantage that the driver may approach the vehicle from any angle without risking to activate the alarm of the vehicle.

Although in the above a surveillance system has been disclosed for intrusion detection or blind-spot detection, the communicating multi-function side-light units may be regarded as an independent inventive concept usable in a surveillance system. As understood from the detailed description above, a wireless communication network may thus be formed on a vehicle, such as a truck and trailer, by mounting a plurality of multi-function side-light units not having the sensor 26. The communication network may support the Zig-Bee or Bluetooth protocol or any other protocol supporting wireless relaying or ad-hoc and/or mesh network communications.

The communication system may further comprise a central unit corresponding to the central unit of the previously described surveillance system.

Further, the communication network may be used for communicating other kinds of information and may further be used in all the applications and embodiments mentioned above.

The above described embodiments of the present invention are particularly advantageous. The multi-function day-running side-light unit of the present invention may be used to deploy a surveillance system using the existing structure/design of the vehicle. National regulations frequently require side-light units to be distributed along the sides of trucks, buses or similar long vehicles. Therefore, the mounting and the electrical infra-structure of the vehicle, presently used for conventional day-running side-lights, are already in place and could be used for the inventive multi-function side-light units in order to provide a vehicle surveillance system.

The multi-function day-running side-light unit of the present invention further offers a convenient and an efficient way of providing an existing vehicle with a surveillance system, simply by replacing all or at least some of a plurality of existing, conventional day-running side-light units with multi-function side-light units.

The multi-function day-running side-light unit may also incorporate an RF transmitter in the unit thereby making it possible to provide a vehicle with a surveillance system without the need for adding additional wiring, e.g. to a central control unit on the vehicle. This is particularly desirable when using the multi-function side-light units on detachable trailers, where additional wiring between the trailer and the towing vehicle is avoided.

The multi-function day-running side-light unit is also desirable because it incorporates the sensor and the RF transmitter within the day-running side-lights unit, the outer appearance as well as the position of the side-light units on the vehicle may be conventional, whereby the surveillance system may be designed as a "concealed system". In such a case a potential intruder would not notice in advance that the vehicle is equipped with any surveillance functionality, thereby reducing the risk of tampering with the sensors.

The invention claimed is:

1. A vehicle day-running side-light unit for use in a vehicle surveillance system comprising a plurality of vehicle day-running side-light units mounted on opposite sides of a vehicle, the side-light unit comprising:

a day-running light source;

a sensor configured to define a surveillance zone on a side of the vehicle, the sensor further configured to detect an object or a movement of an object within the surveillance zone;

a radio frequency (RF) transmitter controlled by the sensor and configured to transmit an RF detection signal from the side-light unit: and an RF receiver configured to receive an incoming RF signal from a second side-light unit in the system, wherein the RF transmitter is further configured to transmit an RF signal in response to the received incoming RF signal.

2. The side-light unit of claim 1, wherein the RF transmitter is configured to transmit an RF signal in response to the RF receiver receiving an incoming RF signal from a central unit of the system.

3. The side-light unit of claim 1, wherein the RF receiver is configured to receive an incoming RFID signal.

4. The side-light unit of claim 1, wherein the day-running light source is configured to operate in response to the RF receiver receiving an RF alarm signal.

5. The side-light unit of claim 1, further comprising:

an audible alarm configured to operate in response to the RF receiver receiving an RF alarm signal.

6. The side-light unit of claim 1, wherein the day-running light source is configured to illuminate when the day-running side-light unit is powered.

7. A vehicle surveillance system comprising a plurality of side-light units mounted on opposite sides of a vehicle, wherein each side-light unit comprises:

a day-running light source;

a sensor configured to define a surveillance zone on a side of the vehicle, the sensor further configured to detect an object or a movement of an object within the surveillance zone; and an RF transmitter controlled by the sensor and arranged configured to transmit an RF detection signal from the side-light unit;

wherein at least one of the side-light units in the system further comprises an RF receiver configured to receive an incoming RF signal from a second side-light unit in the system and wherein the RF transmitter is further configured to transmit an RF signal in response to the received incoming RF signal; and wherein the plurality of side-light units form an RF communication network on the vehicle.

8. The vehicle surveillance system of claim 7, wherein each side-light unit further comprises:

an RF receiver.

9. The vehicle surveillance system of claim 8, wherein each RF transmitter is further configured to transmit an RF signal in response to a respective RF receiver receiving an incoming RF signal from a second side-light unit in the system.

10. The vehicle surveillance system of claim 8, wherein each RF transmitter is further configured to transmit an RF signal in response to the respective RF receiver receiving an incoming RF signal from a central unit of the system.

11. The vehicle surveillance system of claim 8, wherein each RF receiver is configured to receive an incoming RFID signal.

12. The vehicle surveillance system of claim 8, wherein each day-running light source is configured to operate in response to a received RF alarm signal.

13. The vehicle surveillance system of claim 8, wherein each side-light unit further comprises:

an audible alarm configured to operate in response to a received RF alarm signal.

14. The vehicle surveillance system of claim 7, wherein at least two of the surveillance zones of the plurality of side-light units overlap.

15. The vehicle surveillance system of claim 7, further comprising:
a central unit arranged on the vehicle comprising:
a central RF transmitter configured to transmit central RF signals to at least one of the side-light units of the system; and
a central RF receiver configured to receive RF signals from at least one of the side-light units of the system.

16. The vehicle surveillance system of claim 15, wherein the central unit is configured to transmit a central RF alarm signal to the plurality of side-light units of the system in response to an RF detection signal received from one or more side-light units of the system.

17. The vehicle surveillance system of claim 16, wherein the central unit is configured to transmit the central RF alarm signal only if one or more criteria have been met.

18. The vehicle surveillance system of claim 17, wherein the criteria comprises a criterion that the central unit has received RF detection signals from at least two adjacent side-light units of the system.

19. The vehicle surveillance system of claim 17, wherein the criteria comprises a criterion that the central unit has received at least two consecutive RF detection signals from a side-light unit during a predetermined time interval.

20. The vehicle surveillance system of claim 17, wherein the criteria comprises a criterion that the central unit has received at least two consecutive RF detection signals from at least two side-light units located on a same side of the vehicle during a predetermined time interval.

21. The vehicle surveillance system of claim 17, wherein the criteria comprises a criterion that a blinker of the vehicle is being activated on a same side of the vehicle on which an object or movement of an object has been detected.

22. The vehicle surveillance system of claim 16, wherein each side-light unit of the system is configured to operate its respective day-running light source in response to the side-light unit receiving the central RF alarm signal from the central unit.

23. The vehicle surveillance system of claim 16, wherein each side-light unit of the system is configured to generate an audible alarm in response to the side-light unit receiving the central RF alarm signal from the central unit.

24. The vehicle surveillance system according to claim 16, wherein each side-light unit is configured to relay the received central RF alarm signal to a second side-light unit of the system in response to the side-light unit receiving the central RF alarm signal.

25. The vehicle surveillance system of claim 7, wherein the system is further configured to communicate with a second surveillance system arranged on a second vehicle.

26. The surveillance system of claim 7, wherein the plurality of side-light units form a wireless mesh network.

27. A wireless communication system comprising a plurality of vehicle day-running side-light units mounted on opposite sides of a vehicle, wherein each side-light unit comprises:
a day-running light source;
an RF transmitter configured to transmit RF signals; and
an RF receiver configured to receive RF signals;
wherein at least one of the side-light units is configured to transmit an RF signal in response to receiving an incoming RF signal from another side-light unit in the system; and
wherein the plurality of side-light units form a wireless RF communication network on the vehicle.

28. The communication system of claim 27, further comprising:
a central unit arranged on the vehicle comprising:
a central RF transmitter configured to transmit central RF signals to at least one of the side-light units of the system; and
a central RF receiver configured to receive RF signals from at least one of the side-light units of the system.

29. The communication system of claim 28, wherein each side-light unit is configured to relay RF signals from an originating side-light unit in the system to the central unit.

30. The communication system of claim 28, wherein the side-light units are configured to relay RF signals from the central unit to other side-light units in the system.

31. The communication system of claim 28, wherein the wireless RF communication network is a mesh network.

32. A method of using vehicle day-running side-light units for providing a wireless communication network on a vehicle, the method comprising:
providing a plurality of day-running side-light units on opposite sides of the vehicle, each side-light unit comprising:
a light source;
an RF receiver configured to receive an incoming RF signal from a second side-light unit in the network; and
an RF transmitter configured to transmit an RF signal in response to a received incoming RF signal from the second side-light unit in the network.

33. The method of claim 32, further comprising:
providing a central unit arranged to operate as a node in the wireless communication network and to communicate with a side-light unit in the network.

34. The method of claim 33, further comprising:
receiving data at a first side-light unit from an originating side-light unit; and
transmitting the received data from the first side-light unit to the central unit.

35. The method of claim 33, further comprising:
receiving data at a first side-light unit from a central unit; and
transmitting the received data from the first side-light unit to a second side-light unit of the network.

36. The method of claim 33, wherein the central unit is configured to communicate with a remote network.

37. A method of providing a vehicle having a plurality of existing day-running side-lights with a surveillance system, the method comprising:
providing a plurality of surveillance day-running side-light units, each surveillance day-running side-light unit comprising:
a day-running light source;
a sensor configured to define a surveillance zone on a side of the vehicle, the sensor further configured to detect an object or a movement of an object within the surveillance zone; and
an RF transmitter controlled by the sensor and configured to transmit an RF detection signal from the surveillance side-light unit; and
replacing the plurality of existing day-running side-light units of the vehicle with the plurality of surveillance day-running side-light units.

* * * * *